Aug. 7, 1934.   I. SWEDLER ET AL   1,969,531

PIPE COUPLING

Filed Nov. 11, 1933

INVENTORS
Ignatius Swedler.
Arthur L. Greenlaw.
BY
ATTORNEY

Patented Aug. 7, 1934

1,969,531

UNITED STATES PATENT OFFICE 1,969,531

PIPE COUPLING

Ignatius Swedler, Cicero, and Arthur L. Greenlaw, Chicago, Ill., assignors to Flexo Supply Company, St. Louis, Mo., a corporation of Missouri Application November 11, 1933, Serial No. 697,578

2 Claims. (Cl. 285—9)

This invention relates generally to pipe-couplings and, more particularly, to a certain new and useful improvement in couplings especially adapted for pipes conveying compressed air, steam, or other gas or fluid under pressure.

Our invention has for its chief object the provision of a pipe-coupling in which the co-operable tubular members may freely swivel or rotarily shift the one relatively to the other, permitting corresponding movement of the coupled pipe-sections, but in which such members are constantly retained in fluid-tight and leak-proof joint-forming relation.

Our invention has for a further object the provision of a pipe-coupling of the type mentioned in which the co-operable tubular members, while freely rotarily shiftable the one relatively to the other, are also capable under the pressure of a spring of yieldingly or flexibly shifting longitudinally for compensating for wear in an interposed packing, the spring-member being wholly disposed out of line of, and being in no manner affected by, the particular conveyed gas or fluid.

Our invention has for another object the provision of a pipe-coupling of the class mentioned which may be economically constructed, which may be readily installed in service, and which is durable and efficient in the performance of its functions.

And with the above and other objects in view, our invention resides in the novel features of form, construction, arrangement, and combination of parts presently described and pointed out in the claims.

In the accompanying drawing,—

Figure 1:
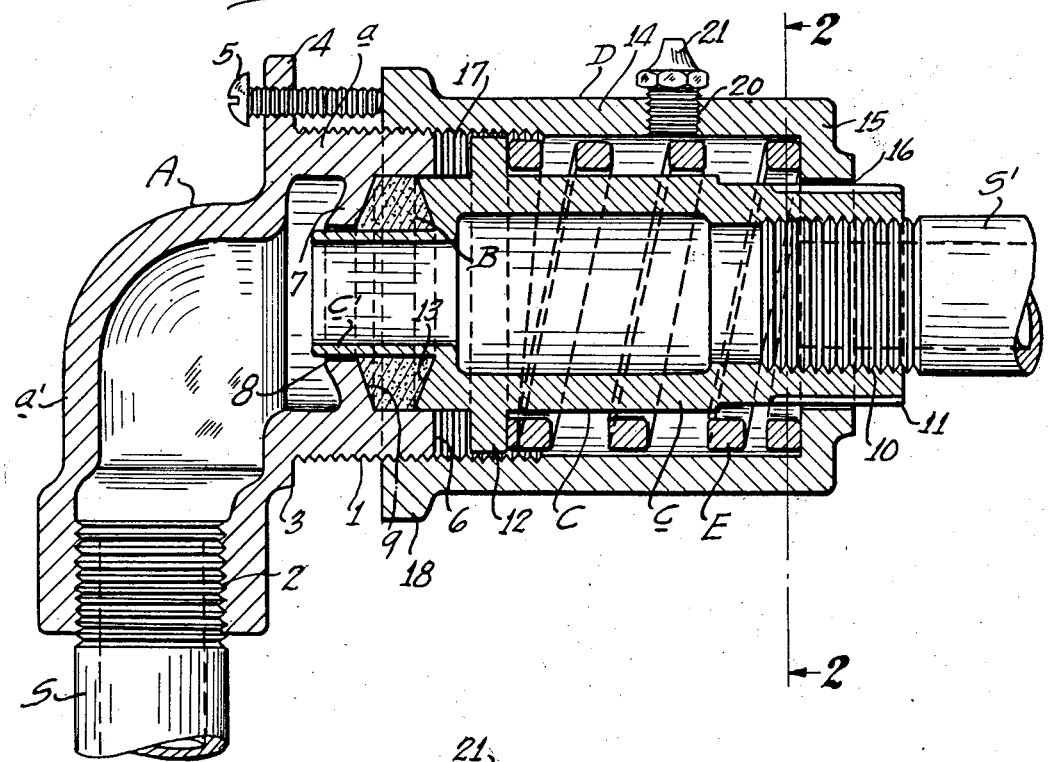
Figure 2:
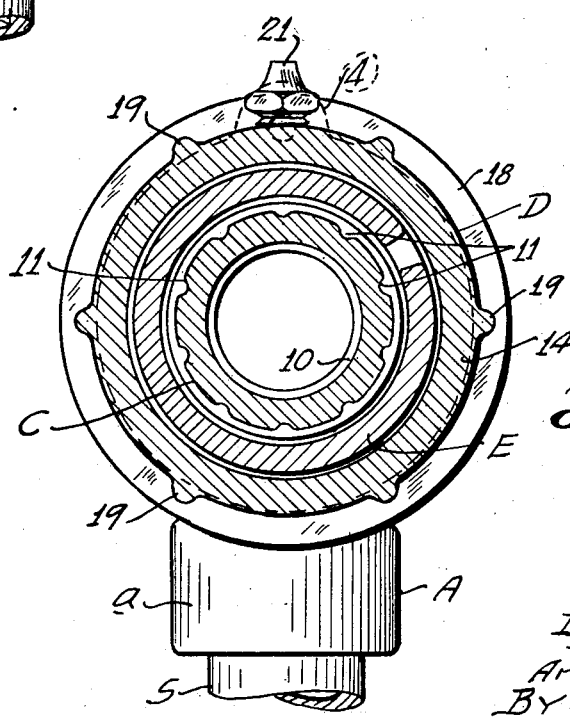

Figure 1 is a longitudinal sectional view of a pipe-coupling embodying our invention; and Figure 2 is a transverse sectional view of the coupling taken approximately on the line 2—2, of Figure 1.

Referring now more in detail and by reference characters to the drawing, which illustrates a preferred embodiment of our invention, the coupling comprises a main or body-member A, which includes a bored or tubular portion $a$ externally threaded, as at 1, and extending at any desired angularity from, and in communication with the bore of, the body-portion $a$, is a suitably bored or tubular extension $a'$ internally threaded at its free end, as at 2, for detachable engagement with one of the pipe-sections S to be coupled.

Intermediate its ends and preferably at the base of its threads 1, the body-portion $a$ is formed with an annular flange or collar 3, which, for purposes presently appearing, is, in turn, formed with a radial projection 4 suitably transversely threaded, as shown, to adjustably seat a set-screw 5.

Internally, in suitable adjacence to its end-face 6, the body-portion $a$ is integrally formed with a ring 7 whose bore 8 provides for communicating between the bores of the body-portions $a$ and $a'$, the end-face 9 of the ring 7 presented toward the end-face 6 of body-portion $a$ being preferably of beveled formation to snugly seat the co-operably beveled end face of a centrally apertured plastic, molded, or otherwise suitably constructed packing or gasket B, which is of suitable thickness and whose opposite end face is oppositely beveled, as shown, for purposes also presently appearing.

C designates the inside swivel of the coupling, which includes a suitably elongated barrel $c$ internally threaded at an end, as at 10, for detachable engagement with the other pipe-section S' to be coupled, the barrel $c$ at its said threaded end being preferably externally fluted, ribbed, or otherwise formed, as at 11, for convenient or efficient engagement by a wrench or other suitable turning-tool, not shown.

Adjacent its opposite end, the barrel $c$ is formed with an annular flange or collar 12, and at its said opposite end the barrel $c$ is formed with a reduced cylindrical stem or extension $c'$ having a bore in open communication with the bore of the barrel $c$, the end-face 13 of the barrel $c$ at the base of its extension or stem $c'$ being oppositely beveled to that of the end-face 9 of ring 7 for snugly engaging the co-operably presented beveled end-face of the packing or gasket B.

D designates the so-called outside collar of the coupling which is substantially a cup-shaped member whose cylindrical wall 14 has an inner diametrical dimension slightly greater than the diametrical dimension of the peripheral face of the collar or flange 12 of barrel $c$, and whose end-wall 15 not only provides an abutment for one end of a spring E coiled on the barrel $c$, but which is also centrally cut-away or apertured, as at 16, for freely fitting about and accommodating relative rotary movement of the barrel $c$ of the swivel C, the spring E abutting at its opposite end against the collar or flange 12, as shown. At its mouth, the cup D is internally threaded, as at 17, for detachable adjustable connection with the body-portion $a$ and externally is formed with an annular flange 18 for engagement by the set or lock-screw 5. Externally the cup D is preferably longitudinally ribbed, as at 19, for ready engagement by a wrench or other suitable turning tool, not shown, and for purposes shortly appearing is provided with a lubricant-port or opening 20 normally closed by a valve or cap 21.

In use and operation, the member A is preferably first fitted upon the pipe-section S, and a packing-ring or gasket B snugly disposed within the body-portion $a$ and upon the ring 7. The swivel C is then disposed with its stem $c'$ projected into the body-portion $a$ and with its beveled end-face 13 abutted against the interposed packing or gasket B. A spring E is then fitted about the swivel C and abutted at an end against the collar 12, when a cup D is sleeved on the barrel C and over the spring E and threaded at its mouth upon the body-member A. As so disposed, the cup D at its end-wall 15 engages the opposite end of the spring E, and as and to the extent that the cup D is threaded upon the member A, the spring E will be compressed, under the compressive pressure of which the swivel C, while permitted to freely rotarily shift with respect to the threadedly connected member A and cup D, will be yieldingly firmly and snugly retained at its end-face 13 in abutting relation with the packing B and the packing B at the same time firmly and snugly held to its seat, the parts thus co-operably functioning in the provision of an exceedingly efficient, fluid-tight, leak-proof joint. And we may add that, even in the event of wear of the packing-ring B, the parts so continue to function under the elastically exerted pressure of the spring E. Thus wear of the parts is automatically taken up and compensated for without affecting in the slightest the efficiency of the coupling, and since, as it will be particularly observed, the spring E is disposed wholly out of direct contact by or with the fluid flowing through the swivel C, its efficiency in the performance of its functions is in no way impaired or reduced, suitable lubricant readily and conveniently injected into the cup D through the port 20 cooling the parts and facilitating free relative rotary or swivelling movement of the coupling pipe-sections S, S'.

As best seen in Figure 1, the swivel-extension $c'$ has an external diameter substantially equal to the diameter of the bore of the gasket or packing B, the extension $c'$ co-operably with the walls provided by the end faces 9 and 13 and the body-portion $a$ compactly housing the gasket B, thereby preventing deformation, breaking up, or escape and loss of any portion of the gasket B and also preserving its original contour and form.

It will be evident that the set-screw 5 will frictionally bind the member D in respective threaded spring-compressing engagement with the body-member A, and it is to be understood that changes in the form, construction, arrangement, and combination of the several parts of our coupling may be made and substituted for those herein shown and described without departing from the nature and principle of our invention.

Having thus described our invention, what we claim and desire to secure by Letters Patent is,—

1. A pipe-coupling comprising a tubular body-member for connection at an end with a pipe-section and provided internally adjacent its opposite end with a packing-seat, a packing-ring disposed within the body-member and upon said seat, a tubular swivel for connection at its outer end with a second pipe-section and having a communicating reduced longitudinally extending tubular stem at its inner end endwise projecting within the body-member and snugly through the bore of the packing-ring, the swivel fitting for rotation at its inner end within the body-member having integrally at the base of said stem an end face abutting for rotary movement an end face of the packing-ring, and means for yieldingly securing the swivel in fluid-tight engagement at its said end face with the packing-ring while permitting relative rotary movement between the swivel and body-member, said means including an annular collar outwardly presented on the swivel adjacent the inner end thereof, a cup having an elongated side-wall and an apertured end-wall sleeved over the swivel and having threaded engagement at its mouth with the body-member, and a spring coiled on and about the swivel and housed within the cup, the spring abutting at its forward end against the rear side face of the collar and at its rear end against the forward face of the end-wall of the cup.

2. A pipe-coupling comprising a tubular body-member for connection at an end with a pipe-section, a ring integrally presented inwardly from the wall, and having an oblique face presented to the opposite end, of the body-member, a packing-ring having oppositely disposed oblique end faces snugly fitting within the body-member and seated at an end face upon said end face of the ring, a tubular swivel for connection at its outer end with a second pipe-section and having a communicating reduced longitudinally extending tubular stem at its inner end endwise projecting within the body-member and snugly through the bore of the packing-ring, the swivel fitting for axial rotation at its inner end within the body-member and having integrally at the base of said stem an oblique end face snugly abutting for rotary movement the opposite end face of the packing-ring, and means for yieldingly securing the swivel in fluid-tight engagement at its said end face with the packing-ring while permitting relative rotary movement between the swivel and body-member, said means including an annular collar outwardly presented on the swivel adjacent the inner end thereof, a cup having an elongated side-wall and an aperture end-wall sleeved over the swivel and having threaded engagement at its mouth with the body-member, and a spring coiled on and about the swivel and housed within the cup, the spring abutting at its forward end against the rear side face of the collar and at its rear end against the forward face of the end-wall of the cup.

IGNATIUS SWEDLER.
ARTHUR L. GREENLAW.